Jan. 2, 1940.  A. S. CAPONEY  2,185,909
AUTOMATIC SAFETY VEHICLE DOOR LOCKING DEVICE
Filed April 8, 1938   2 Sheets-Sheet 1
FIG. 1
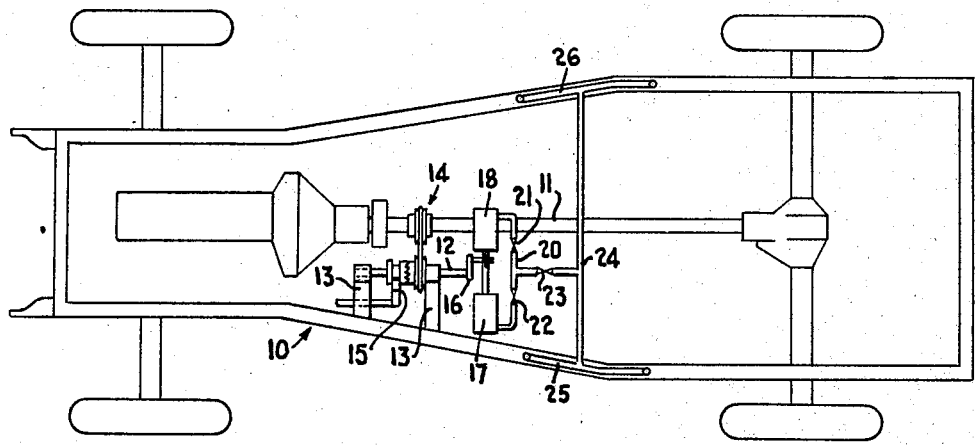
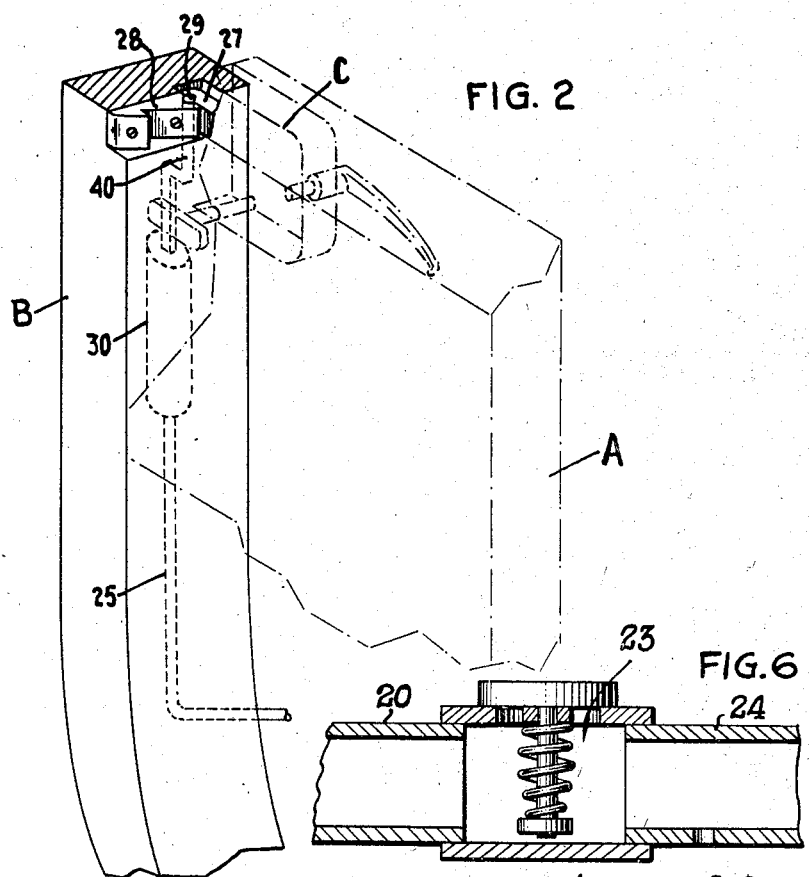
ANTHONY S. CAPONEY
INVENTOR
BY Victor J. Evans & Co.
ATTORNEYS Jan. 2, 1940.   A. S. CAPONEY   2,185,909
AUTOMATIC SAFETY VEHICLE DOOR LOCKING DEVICE
Filed April 8, 1938   2 Sheets-Sheet 2

ANTHONY S. CAPONEY
INVENTOR
BY *Victor J. Evans & Co.*
ATTORNEYS

Patented Jan. 2, 1940

2,185,909

UNITED STATES PATENT OFFICE 2,185,909

AUTOMATIC SAFETY VEHICLE DOOR LOCKING DEVICE

Anthony S. Caponey, Trenton, N. J.

Application April 8, 1938, Serial No. 200,996

4 Claims. (Cl. 180—82)

This invention relates to improvements in safety door locks and more especially to new and improved means for locking the doors of automobiles or similar vehicles.

In automobiles and similar vehicles of the types now in use, doors are commonly locked by the ordinary spring-pressed type of latch. This type of door fastening means is disadvantageous in that often through inadvertence or accident the door is improperly locked or, in movement of persons in the vehicle, becomes unlatched whereby the door opens while the vehicle is in motion thereby facilitating dangers in accidents to passengers who might likely fall therethrough. This difficulty can be avoided by the use of latches on the doors which can be moved into locked position while the vehicle is in motion; but this procedure is disadvantageous in that it necessitates locking of the door and unlocking of the door whenever the vehicle starts in motion and stops.

It is among the more important objects of the present invention to provide a new and improved door locking means which is substantially automatic in action, that is to say the locking means functions only when the vehicle is in motion, said locking means serving to engage with portions of automobile doors or locks thereof, whereby the door is held secure in locked position whenever the vehicle is in motion, thereby preventing unauthorized opening of the doors of the vehicle from the outside thereof or accidental opening from the inside.

It is also an object of the present invention to provide a novel type of door locking means which can be easily fitted into existing types of automobile frames without substantially increasing the cost of manufacture thereof and without necessitating employment of skilled labor.

Among the features of the device according to the present invention are that it is comparatively simple in construction and can be fabricated from relatively inexpensive materials, resulting in economies of manufacture. Another feature is that several of the parts comprising the device are of standard form, thereby obviating the use of special tools or manufacturing processes.

A feature of the device according to the present invention is that the door locking mechanism is automatically thrown into disengaged position when the vehicle is stopped, irrespective of whether the vehicle is stopped as in normal use or due to accident, without any further action on the part of the operator.

Other objects, advantages and features of the new and improved automobile door locking mechanism according to the present invention will be apparent to those skilled in the art during the course of the following description.

Regarded in certain of its broader aspects, the present invention comprises a gas compressor associated with the jack shaft of the vehicle and pneumatically associated with latching means on the doors of the vehicle. Rotation of the jack shaft results in actuation of the pneumatic latching means.

In order to facilitate a fuller and more complete understanding of the matter of the present invention specific embodiments thereof, herein illustrated, will be hereinafter described, it being clearly understood however that the specific embodiments illustrated are given solely by way of example and are non-limitative of the invention except as indicated within the scope of the subjoined claims.

Referring, then, to the drawings—

Fig. 1 is essentially a diagrammatic top plan view of a vehicle showing details of the compressor mechanism forming a part of the present invention;

Fig. 2 is essentially a perspective view, partially in phantom, illustrating a preferred type of pneumatically actuable vehicle door latching means;

Fig. 6 is substantially a detailed sectional view of a portion of the device illustrated in Fig. 1.

Figure 3:
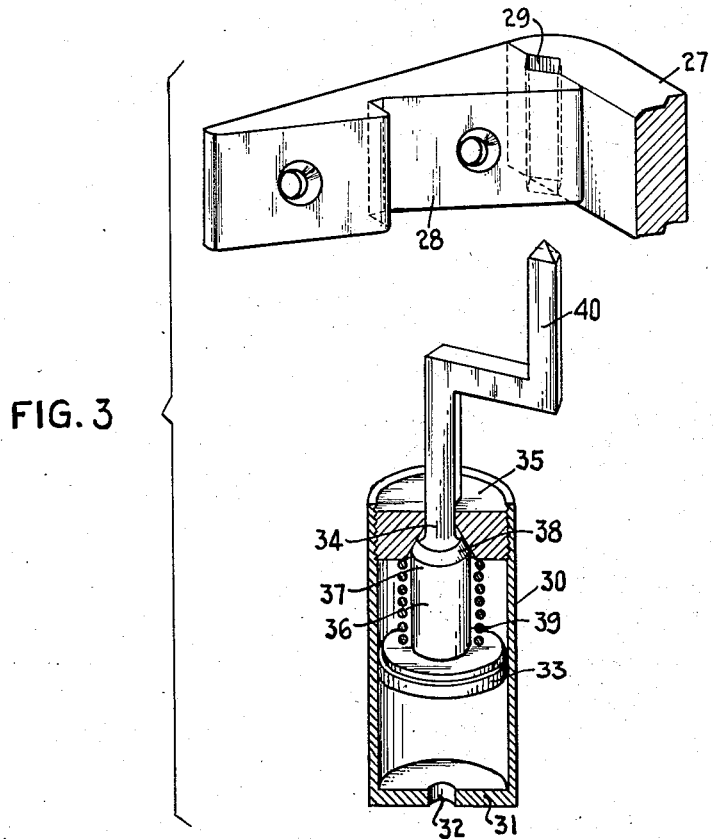
Fig. 3 is essentially a perspective view of the pneumatically actuable latching mechanism and door stop and bolt adapted to function in conjunction therewith.

An automotive vehicle frame of the conventional type, generally designated by the numeral 10, mounted on wheels and having an engine is provided with a jack shaft 11, said shaft rotating whenever the vehicle is in motion. A normally freely rotatable shaft 12 journalled in portions 13 of the vehicle frame is associated with said jack shaft by means including a gear belt drive generally designated at 14, said drive being engageable with the shaft 12, upon occasion, by actuation of the clutch mechanism generally designated at 15. The shaft 12 carries an eccentric or crank 16 operating a pair of compressors 17 and 18, said compressors being connected by the line 20 having check valves 21 and 22 therein and through valve 23 to the line 24. The check valves 21 and 22 are of the conventional type, that is to say when the gas in the chamber of the pump 17 is under compression, the valve 22 will be opened and the valve 21 will be closed. Similarly, when gas in the chamber of the pump 18 is under pressure the valve 22 will be closed and the valve 21 opened, whereby a substantially uniform stream of compressed gas is supplied to the line 24. The valve 23 is essentially a relief or safety valve which is adjustable to maintain the compressed gas in the line 24 at an essentially uniform pressure. The vehicle is provided with a body having doors therein (not shown) and at least one of said doors is provided with a pneumatic safety door lock device, to be hereinafter described, connected to and operable by the pneumatic supply line 24 through the feed lines 25 and 26. It is to be noted that the clutch mechanism generally designated by the numeral 15 is normally in engagement whereby the shaft 12 is rotated whenever the vehicle is in motion. The clutch mechanism in other words is a means for rendering the safety device inoperative and is not normally used during the operation of the vehicle.

Referring now especially to Figs. 2 and 3, the presently preferred type of automatic safety door lock device will be described. A vehicle door of the conventional type, a portion of which is shown in phantom in Fig. 2 and designated by the letter A, when closed abuts against the door jamb or upright door pillar B. A lock, as shown substantially diagrammatically and in phantom, is designated by the letter C. It is provided with a locking bolt 27 adapted to seat behind the stop 28 mounted in the door jamb B substantially as shown, whereby when the bolt 27 is seated behind the stop 28, as illustrated in Fig. 2, the door is held in locked condition. It will be noted that the stop 28 is of the conventional type whereby the bolt can engage at two positions with the stop. However, it is to be understood that the second position is the one normally occupied by the bolt when the door is fully closed and locked. V-shaped openings are formed in the adjoining faces of the bolt 27 and the stop 28, whereby when the bolt is seated against the stop, as shown in Figs. 2 and 3, an opening 29 essentially rectangular in outline is provided extending vertically across the face of the bolt and of the stop. The pneumatically actuated locking device and the manner wherein it cooperates with this opening formed in the lock and stop will now be described.

A substantially cylindrical chamber 30 closed at one end 31 except for an opening 32 communicating with one of the feed lines 25 or 26 hereinbefore referred to, is provided with a close fitting slidable piston 33 therein, mounted on a rod-like member generally designated by the numeral 34 receivable within a guide block 35 mounted in the open end of the chamber 30 substantially as shown. The portion 36 of the bar-like member 34 is relatively of larger size than the opening in the guide block 35. Accordingly, movement of the piston 33 away from the end 31 of the chamber 30 is limited by abutment of the end portion 37 of the standard 36 against the face of the block 35. It is presently preferred to provide the block 35 with a tapered frusto-conical guide opening, substantially as shown in Fig. 3, and form the end 37 of the standard 36 in conical shape to present a surface 38 adapted to abut against the sides of said guide opening. A spring 39 positioned circumjacent the portion 36 of the bar-like member 34 and abutting against, on the one end, the block 35 and, on the other, the piston head 33 normally tends to move the piston 33 toward the end 31 of the chamber 30.

The end of the bar-like member 34 positioned outside the chamber 30 is provided with an essentially rectangular formation 40 on the end thereof receivable, upon occasion, within the opening 29 defined by the V-shaped cutaway portions of the bolt 27 and the stop 28. It will be understood, of course, that the chamber 30 is mounted in or adjacent the door jamb B in a manner whereby alignment of the bar 40 with the opening when the bolt is in locked position is assured.

In operation, assuming the vehicle not to be moving, the spring 39 normally presses the piston 33 toward the end 31 of the chamber 30 whereby the plug-like end portion 40 of the member 34 is positioned beneath but adjacent the opening 29 defined by the V-shaped slots formed in the bolt 27 and stop 28 as aforesaid. When the vehicle comences movement the shaft 11 rotates, thereby resulting in rotation of the shaft 12, operation of the pumps 17 and 18 and compression of gas in the pneumatic supply line 24. As hereinabove mentioned, the supply line 24 is connected through the feeder lines 25 or 26 to the chamber 30. Accordingly, the pressure of gas within the chamber defined by the cylindrical member 30, the end 31 thereof and piston 33 is substantially increased, causing movement of the piston 33 away from the end 31 and resulting in movement of the plug-like element 40 into the opening 29. When the plug 40 is positioned within the opening 29 the sides of the plug closely fit in and abut against the sides of the V-shaped openings formed in the bolt and stop, whereby relative movement of said bolt and said stop is precluded. Thus it will be seen that whenever the vehicle is in motion the safety mechanism will function to preclude unlocking of the doors.

Figure 4:
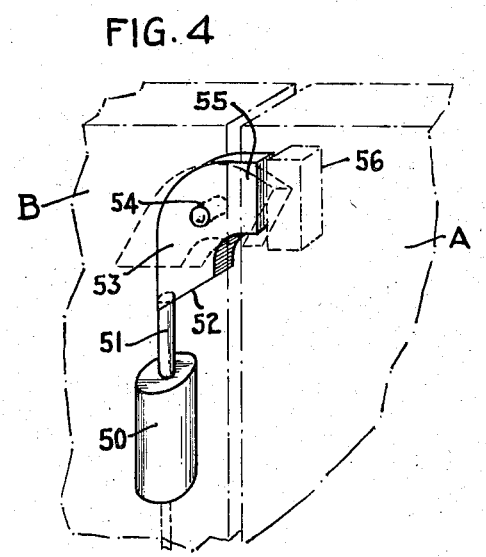

A modified form of the novel automatic safety door lock device according to the present invention is illustrated in Fig. 4. In this embodiment of the invention a chamber 50, connected to the supply line 24 and provided with a slidable piston and cooperating associated elements, as described in conjunction with the hereinbefore mentioned embodiment of the present invention, is mounted within the door jamb B and is provided with a slidable rod 51 connected with the piston, the end of which abuts against a cam surface 52 of a blocklike member 53, rotatable about a pivot 54 and having an end portion 55 projecting through the opening in the jam substantially as shown. Movement of the piston within the chamber 50 causes the block-like member 53 to rotate about the pivot 54, resulting in movement of the end portion 55 into an opening 56 formed in the door A whereby the door is locked in position relative to the jamb B. It will be apparent that in utilizing this embodiment of the present invention other locking means as, for example, the lock C in the aforedescribed embodiment of the present invention is unnecessary, except in certain instances where use of both types of locking means may prove desirable.

Figure 5:
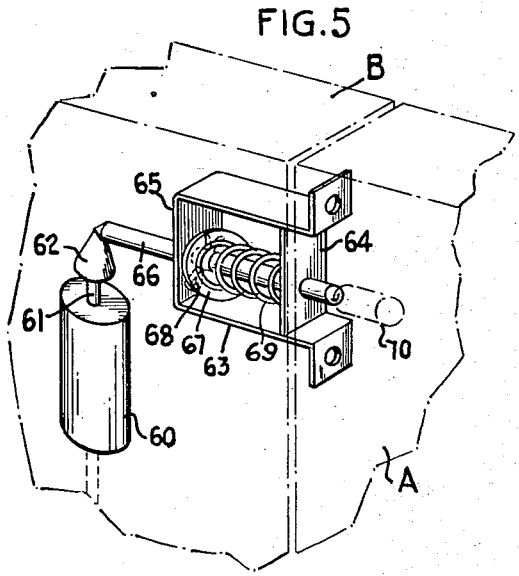
Figs. 4 and 5 are perspective views partially in phantom, illustrating modified forms of the novel door latching mechanism according to the present invention shown mounted as in use.

Another modification of the present invention is illustrated in Fig. 5 and comprises a pneumatic chamber 60 pneumatically connected with the supply line 24 and having a rod 61 attached to and movable in conjunction with the piston within said chamber, said rod having an essentially conical cam head 62 mounted thereon, substantially as shown. A bracket 63 fastened in the door jamb B includes essentially vertically positioned cross pieces 64 and 65 having openings therein adapted to slidably receive and hold a rod 66, said rod having a washer or the like 67 mounted thereon between said uprights 64 and 65 as, for example, by means of the cotter pin 68, against which abuts a spring 69 resting on the other end against the vertical bracket element 64, substantially as illustrated. An opening 70 formed in a portion of the door A is alignable with the rod 66 when the door is in closed position. In operation, movement of the vehicle results in vertical movement in an upright direction of the rod 61 whereby the cam 62, abutting against the end of the rod 66, presses said rod against the spring 69 and forces the end of the rod into the opening 70 whereby the door is held in locked condition relative to the jamb. This embodiment of the present invention, similar to the embodiment illustrated in Fig. 4, can be used as a door closure without the use of auxiliary locking means such as the lock C of the embodiment of the present invention illustrated in Fig. 2.

It is to be understood that this improvement is capable of extended application and is not confined to the exact showing of the drawings nor to the precise construction described and, therefore, such changes and modifications may be made therein as do not affect the spirit of the invention nor exceed the scope thereof as expressed in the appended claims.

I claim:

1. In an automotive vehicle of the type described having a shaft rotatable when the vehicle is in motion, a body and at least one door therein, an automatic safety door locking device which comprises a compressor associated with and operable by said shaft, a pneumatic line connected to said compressor, means for maintaining gas pressure in said line substantially constant comprising an adjustable relief valve therein, a cylinder, open at one end, pneumatically connected to said line, and mounted near said door, a piston slidable within said cylinder, a slidable spring-pressed bar-like member attached to and movable by said piston, normally tending to move said piston whereby the volume determined by the interior of said cylinder and said piston is diminished, and door locking means connected to and operable by movement of said bar-like member, whereby, when the vehicle is in motion, the door is locked.

2. In an automotive vehicle of the type described having a shaft rotatable when the vehicle is in motion, a body and at least one door therein, an automatic safety door locking device which comprises a compressor associated with and operable by said shaft, a pneumatic line connected to said compressor, means for maintaining gas pressure in said line substantially constant comprising an adjustable relief valve therein, a cylinder, open at one end, pneumatically connected to said line, and mounted near said door, a piston slidable within said cylinder, a slidable spring-pressed bar-like member attached to and movable by said piston, normally tending to move said piston whereby the volume determined by the interior of said cylinder and said piston is diminished, and door locking means connected to and operable by movement of said bar-like member, said locking means comprising a block-like member, rotatable about a pivot, having a cam surface formed on a side thereof adapted to abut against and ride upon an end portion of said slidable bar-like member, a part of said block being movable into engagement with an opening formed in said door whereby, when the vehicle is in motion, the door is locked by movement of the block-like member into engaged position.

3. In an automotive vehicle of the type described having a shaft rotatable when the vehicle is in motion, a body and at least one door therein, an automatic safety door locking device which comprises a compressor associated with and operable by said shaft, a pneumatic line connected to said compressor, means for maintaining gas pressure in said line substantially constant comprising an adjustable relief valve therein, a cylinder, open at one end, pneumatically connected to said line, and mounted near said door, a piston slidable within said cylinder, a slidable spring-pressed bar-like member attached to and movable by said piston, normally tending to move said piston whereby the volume determined by the interior of said cylinder and said piston is diminished, an essentially frusto-conical shaped cam head mounted on the exposed end of said bar-like member, a spring-pressed slidable rod, movable in a direction substantially at right angles to the direction of movement of said bar-like member, one end of said rod riding upon said cam head and the other end of said rod being receivable in and engageable with an opening formed in a portion of said door, whereby, when the vehicle is in motion, the door is locked by movement of said rod into engaged position.

4. In an automotive vehicle of the type described having a shaft rotatable when the vehicle is in motion, a body and at least one door therein, an automatic safety door locking device which comprises a compressor associated with and operable by said shaft, a pneumatic line connected to said compressor, means for maintaining gas pressure in said line substantially constant comprising an adjustable relief valve therein, a cylinder, open at one end, pneumatically connected to said line, and mounted near said door, a piston slidable within said cylinder, a slidable spring-pressed bar-like member attached to and movable by said piston, normally tending to move said piston whereby the volume determined by the interior of said cylinder and said piston is diminished, the free end of said bar-like member comprising a straight plug element of essentially rectangular cross-sectional outline, a door lock bolt and cooperating stop-block, each having a V-shaped channel cut in the abutting sides thereof defining a passageway, essentially rectangular in cross-sectional outline, adapted to receive and engage with said plug element, whereby, when the vehicle is in motion, movement of the door lock bolt relative to the stop-block is precluded by engagement of said lock bolt and stop-block with said plug element.

ANTHONY S. CAPONEY.